United States Patent
Guo et al.

(10) Patent No.: US 11,214,584 B2
(45) Date of Patent: Jan. 4, 2022

(54) POLYOLS FOR PREPARING FLEXIBLE POLYURETHANE FOAM, AND PREPARATION METHOD AND APPLICATION THEREOF

(71) Applicant: NANJING TECH UNIVERSITY, Nanjing (CN)

(72) Inventors: Kai Guo, Nanjing (CN); Zheng Fang, Nanjing (CN); Wei He, Nanjing (CN); Ning Zhu, Nanjing (CN); Xin Hu, Nanjing (CN); Jiangkai Qiu, Nanjing (CN); Chengkou Liu, Nanjing (CN); Jingjing Meng, Nanjing (CN); Jindian Duan, Nanjing (CN); Pingkai Ouyang, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 17/108,957

(22) Filed: Dec. 1, 2020

(65) Prior Publication Data
US 2021/0087211 A1     Mar. 25, 2021

Related U.S. Application Data

(63) Continuation-in-part of application No. 16/221,366, filed on Dec. 14, 2018, now abandoned.

(51) Int. Cl.
*C07F 9/09* (2006.01)
*C08G 18/76* (2006.01)
(Continued)

(52) U.S. Cl.
CPC ......... *C07F 9/091* (2013.01); *C08G 18/4816* (2013.01); *C08G 18/6785* (2013.01);
(Continued)

(58) Field of Classification Search
None
See application file for complete search history.

(56) References Cited

U.S. PATENT DOCUMENTS 3,332,893 A * 7/1967 Birum .................. C08G 18/388
  521/160
3,660,502 A * 5/1972 Case .................. C08G 65/2639
  568/601

(Continued)

*Primary Examiner* — Tae H Yoon
(74) *Attorney, Agent, or Firm* — CBM Patent Consulting, LLC

(57) ABSTRACT

It discloses a polyether polyols for preparing flexible polyurethane foam, and a preparation method and application thereof. The method comprises the following steps: (1) carrying out a reaction on phosphorus oxychloride, epichlorohydrin, a first acidic catalyst and an inert solvent in a first microchannel reactor to obtain a chloroalkoxy phosphorus compound; (2) carrying out a reaction on the chloroalkoxy phosphorus compound, glycidol, a second acidic catalyst and an inert solvent in a second microchannel reactor to obtain a hydroxy compound; (3) carrying out a ring-opening reaction on the hydroxy compound, epoxy vegetable oil, a basic catalyst and an inert solvent in a third microchannel reactor to obtain a vegetable oil polyol; and (4) carrying out an addition polymerization reaction on the vegetable oil polyol, propylene oxide and an inert solvent in a fourth microchannel reactor to obtain the polyether polyols for preparing flexible polyurethane foam.

8 Claims, 2 Drawing Sheets

(51) Int. Cl.
*C08G 18/67* (2006.01)
*C08G 18/48* (2006.01)

(52) U.S. Cl.
CPC ..... *C08G 18/7621* (2013.01); *C08G 18/7671* (2013.01); *C08G 2110/0008* (2021.01)

(56) References Cited

U.S. PATENT DOCUMENTS

| | | | | |
|---|---|---|---|---|
| 3,779,953 | A * | 12/1973 | Papa | C08G 18/66 521/171 |
| 6,180,686 | B1 * | 1/2001 | Kurth | C08J 9/0023 521/51 |
| 6,630,565 | B1 * | 10/2003 | Van Den Bergen | C07F 9/091 528/398 |
| 6,686,435 | B1 * | 2/2004 | Petrovic | C07D 303/42 524/589 |
| 9,035,105 | B2 * | 5/2015 | Reese | C08G 18/32 568/620 |
| 10,246,457 | B2 * | 4/2019 | Siu | C07D 405/14 |
| 2011/0065821 | A1 * | 3/2011 | Abraham | C08G 18/6696 521/114 |

* cited by examiner

POLYOLS FOR PREPARING FLEXIBLE POLYURETHANE FOAM, AND PREPARATION METHOD AND APPLICATION THEREOF

This application is a continuation-in-part application of U.S. patent application Ser. No. 16/221,366 filed 14 Dec. 2018, now abandoned, that claims priority to Chinese Application No. CN201811153268.3 filed on 29 Sep. 2018, the entire contents of each of which are hereby incorporated by reference.

TECHNICAL FIELD

The present invention relates to a polyols for preparing flexible polyurethane foam, and a preparation method and application thereof. The polyols can be used for preparing flame-retardant flexible polyurethane foam plastics.

BACKGROUND ART

With the rapid development of modern industry, flexible polyurethane foam has been widely used in the fields of aviation, shipbuilding, automobiles, construction, chemical industry, electric appliances and the like. However, its flammability seriously affects its excellent performance and hinders the development of new markets. The United States, Western Europe, Japan and other countries have imposed strict laws and regulations on the flame retardancy of construction, electronics, transportation, entertainment, etc. China has also promulgated a series of regulations in recent years. Therefore, lowering the cost, widening the application range of the flexible foam and improving the flame retardancy of the foam are urgent problems to be solved in the polyurethane industry.

At present, there are mainly two flame-retarding methods for polyurethane foam: a flame retardant addition method and a reactive flame retardant method. The flame retardant addition method often causes foam collapse, cracking, powdering or great reduction of physical and mechanical properties such as rebound elasticity, so that the foam loses its own performance advantages; and the flame-retardant effects of these flame retardants are not significant when added alone. The reactive flame retardant method is to add a reactive flame retardant, such as a polyhydroxy compound containing a flame-retardant element such as phosphorus, chlorine, bromine, boron or nitrogen, into a flexible polyurethane foam formula, or introduce a flame-retardant element into a polyether glycol structure to obtain the flame retardancy. This method has the advantages of good flame retardancy durability, little impact on physical and mechanical properties and the like. The introduction of the flame-retardant element in polyether polyols enables polyurethane products to have higher heat resistance, dimensional stability and strength, and is currently the focus of research.

Patent CN103483575A discloses a preparation method of a polyether polyol used in flame-retardant slow-rebound polyurethane foam plastics, which comprises: mixing a small molecule alcohol with a phosphorus-containing compound to react to prepare an initiator, carrying out polymerization reaction on the initiator and oxidized olefin under the action of a catalyst to obtain a crude ether of the phosphorus-containing flame-retardant flexible foam polyether polyol, and carrying out neutralization, refinement, dewatering and filtration on the crude ether. Patent CN102875791A discloses a synthesis method of a flexible foam flame-retarding polyether polyol, which comprises: reacting a melamine-formaldehyde condensate with an amine compound, further polymerizing with an acidic compound to obtain a polyether initiator, and further polymerizing the polyether initiator and oxidized olefin under the action of an alkali metal catalyst to obtain the flame-retardant polyether glycol.

In the U.S. Pat. No. 3,779,953, 1,2,5,6-tetrabromo-3,4-dihydroxyhexane and a phosphorus-containing polyol are used for reaction to prepare a polyol, which is applied to prepare flexible polyurethane foam containing a bromine aliphatic alcohol, but the raw material 1,2,5,6-tetrabromo-3,4-dihydroxyhexane is high in cost. In the U.S. Pat. No. 3,660,502, a low aliphatic 1,2-monoepoxy compound reacts with halogen-containing hemiacetal or hemiketal to produce an aliphatic polyol or mercaptan. The polyol of the present invention is novel in structure, but has a high reaction temperature, long reaction time, and high energy consumption. In the U.S. Pat. No. 3,332,893, a reaction product of a trihalide and ethylene glycol reacts with 1,2-epoxyalkane, an obtained product reacts with aldehydes, and is finally hydrolyzed to obtain a hydroxyalkyl α-hydroxyalkyl phosphonate product, which is applied to prepare fireproof polyurethane foam materials. The reaction is a batch reaction, with a complex operation, a low self-control level and a high cost. In the U.S. Pat. No. 8,507,701, an organic acid is oxidized into an organic peroxyacid with hydrogen peroxide, a double bond in unsaturated vegetable oil is epoxidized with the organic peroxyacid to produce an epoxidized product and an organic acid, and an epoxy ring is opened with the organic acid to form a hydroxyl ester. The use of hydrogen peroxide in the batch reaction has potential safety hazards, and the reaction temperature is high and must be strictly controlled, resulting in a large amount of wastewater after reaction, which is easy to cause environmental pollution. In the U.S. Pat. No. 10,246,547, a vegetable oil polyol is prepared by maleic anhydride of palm oil, glycerol decomposition of the palm oil, ester exchange of the palm oil with pentaerythritol and epoxidation of an unsaturated double bond in the palm oil, and the prepared vegetable oil polyol is applied in rigid and semi-rigid polyurethane foam. The batch reaction has a tedious process, a complex operation, and high energy consumption. In the U.S. Pat. No. 9,035,105, a polyether polyol is prepared with a hydroxyl-containing vegetable oil polyol, alkylene oxide and a small molecule alcohol, which is applied to the flexible polyurethane polyol, the batch reaction has long reaction time and a complex operation, and a metal catalyst is used in the reaction, which is high in cost and is easy to cause environmental pollution.

In summary, the flexible foam flame-retardant polyether polyols are mostly prepared by introducing a flame-retardant element containing phosphorus, chlorine, bromine, boron or nitrogen in the polymerization process of an active-hydrogen-containing compound (polyol or polyamine) and an epoxide (propylene oxide, ethylene oxide); polyether polyols used in flexible polyurethane foam generally have a large molecular weight, that is, large amounts of small molecular alcohols and epoxides are required, and these raw materials are derived from petroleum-derived products and have high dependence on petrochemical resources, high energy consumption, high environmental damage and high pollution; and because they are synthesized through a batch reactor, there exist the following defects: (1) long reaction time; (2) high energy consumption; (3) low equipment and automatic-control level; and (4) unavoidable side reactions, causing lower product quality.

SUMMARY OF THE INVENTION

A purpose of the present invention is to provide a method for preparing a flame-retardant polyols for preparing flexible polyurethane foam by a continuous process by introducing epoxy vegetable oil and a phosphorus or chlorine element, which aims to overcome the dependence of the existing preparation of polyols for preparing flexible polyurethane foam on petrochemical resources so as to introduce the green renewable epoxy vegetable oil resource, and also aims to overcome the defects of long reaction time, higher energy consumption, low product quality and incapability of continuous production in a discontinuous process for producing a flame-retardant polyols for preparing flexible polyurethane foam.

Another purpose of the present invention is to provide a polyols for preparing flexible polyurethane foam prepared by the method.

A final purpose of the present invention is to provide application of the polyols for preparing flexible polyurethane foam.

In order to achieve the above purposes, the technical solutions of the present invention are as follows:

A preparation method of a polyols for preparing flexible polyurethane foam comprises the following steps:

(1) simultaneously pumping a solution A obtained by dissolving phosphorus oxychloride in an inert solvent and a solution B obtained by dissolving epichlorohydrin and a first acidic catalyst in an inert solvent into a first microchannel reactor of a microchannel reaction device to carry out a reaction, thereby obtaining a chloroalkoxy phosphorus compound;

(2) simultaneously pumping a solution C obtained by dissolving glycidol and a second acidic catalyst in an inert solvent and the chloroalkoxy phosphorus compound obtained in step (1) into a second microchannel reactor of the microchannel reaction device to carry out a reaction, thereby obtaining a hydroxy compound;

(3) simultaneously pumping a solution D obtained by dissolving epoxy vegetable oil and a basic catalyst in an inert solvent and the hydroxy compound obtained in step (2) into a third microchannel reactor of the microchannel reaction device to carry out a ring-opening reaction, thereby obtaining a vegetable oil polyol; and (4) simultaneously pumping a solution E obtained by dissolving propylene oxide in an inert solvent and the vegetable oil polyol obtained in step (3) into a fourth microchannel reactor of the microchannel reaction device to carry out an addition polymerization reaction, thereby obtaining the polyols for preparing flexible polyurethane foam having an flame-retardant effect.

A schematic diagram of synthesis of the present invention is shown in FIG. 2.

Preferably, the preparation method of the polyols for preparing flexible polyurethane foam having a flame-retardant effect comprises the following steps:

(1) simultaneously pumping a solution A obtained by dissolving phosphorus oxychloride in an inert solvent and a solution B obtained by dissolving epichlorohydrin and a first acidic catalyst in an inert solvent into a first micromixer of a microchannel reaction device, thoroughly mixing, and introducing the mixture into a first microchannel reactor to carry out a reaction, thereby obtaining reaction effluent;

(2) simultaneously pumping a solution C obtained by dissolving glycidol and a second acidic catalyst in an inert solvent and the reaction effluent obtained in step (1) into a second micromixer of the microchannel reaction device, thoroughly mixing, and introducing the mixture into a second microchannel reactor to carry out a reaction, thereby obtaining reaction effluent containing a hydroxy compound;

(3) simultaneously pumping a solution D obtained by dissolving epoxy vegetable oil and a basic catalyst in an inert solvent and the reaction effluent containing a hydroxy compound obtained in step (2) into a third micromixer of the microchannel reaction device, thoroughly mixing, and introducing the mixture into a third microchannel reactor to carry out a ring-opening reaction, thereby obtaining reaction effluent containing a vegetable oil polyol; and (4) simultaneously pumping a solution E obtained by dissolving propylene oxide in an inert solvent and the reaction effluent containing a vegetable oil polyol obtained in step (3) into a fourth micromixer of the microchannel reaction device, thoroughly mixing, and introducing the mixture into a fourth microchannel reactor to carry out an addition polymerization reaction, thereby obtaining the polyols for preparing flexible polyurethane foam.

In step (1), the molar ratio of the phosphorus oxychloride to the epichlorohydrin to the first acidic catalyst is 1:(1.9-2.3):(0.02-0.08), preferably 1:(2.1-2.2):0.05, most preferably 1:2.1:0.05; the reaction temperature of the first microchannel reactor is 70-100° C., preferably 80-90° C., most preferably 80° C.; the reaction residence time is 5-10 min, preferably 5-7 min, most preferably 7 min; the volume of the first microchannel reactor is 2-8 ml, preferably 3.5 mL; and the flow rate of the solution A pumped into the microchannel reaction device is 0.1-0.8 ml/min, preferably 0.25-0.35 ml/min, most preferably 0.25 ml/min; and the flow rate of the solution B pumped into the microchannel reaction device is 0.1-0.8 ml/min, preferably 0.25-0.35 ml/min, most preferably 0.25 ml/min.

The inert solvent is any one or more of benzene, dichloroethylene, dichloroethane, chloroform, pentane, n-hexane, carbon tetrachloride and xylene, preferably carbon tetrachloride. The first acidic catalyst in step (1) and the second acidic catalyst in step (2) are each independently any one or more of sulfuric acid, hydrochloric acid, phosphoric acid, fluoroboric acid, aluminum chloride and ferric chloride, preferably aluminum chloride.

The molar ratio of the phosphorus oxychloride in step (1) to the glycidol in step (2) is 1:(1-1.3), preferably 1:1; the molar ratio of the phosphorus oxychloride to the second acidic catalyst is 1:(0.02-0.05), preferably 1:0.03; the reaction temperature of the second microchannel reactor is 70-100° C., preferably 80-90° C., most preferably 85° C.; the reaction residence time is 5-10 min, preferably 8 min; the volume of the second microchannel reactor is 2-32 ml, preferably 7-8 ml, most preferably 8 ml; and the flow rate of the solution C pumped into the microchannel reaction device is 0.2-1.6 ml/min, preferably 0.5-0.7 ml/min, most preferably 0.5 ml/min.

In step (3), the epoxy vegetable oil is any one or more of epoxy olive oil, epoxy peanut oil, epoxy rapeseed oil, epoxy cotton seed oil, epoxy soybean oil, epoxy coconut oil, epoxy palm oil, epoxy sesame oil, epoxy corn oil or epoxy sunflower oil, preferably epoxy soybean oil or epoxy cotton seed oil; the basic catalyst is any one or more of cesium carbonate, sodium carbonate, potassium carbonate, sodium hydroxide, potassium hydroxide, sodium bicarbonate, magnesium carbonate, triethylamine, pyridine or sodium methoxide, preferably cesium carbonate; the molar ratio of epoxy groups in the epoxy vegetable oil to the hydroxy compound is 1:(1-2), preferably 1:(1.1-1.3), most preferably 1:1.3; and the mass percentage of the basic catalyst to the epoxy vegetable oil is 0.02-0.1%.

In step (3), the reaction temperature of the third microchannel reactor is 90-140° C., preferably 110-120° C., most preferably 120° C.; the reaction residence time is 5-15 min, preferably 10-12 min, most preferably 10 min; the volume of the third microchannel reactor is 4-96 ml, preferably 20-33.6 mL, most preferably 20 mL; and the flow rate of the solution D pumped into the microchannel reaction device is 0.4-3.2 ml/min, preferably 1-1.4 ml/min, most preferably 1 ml/min.

In step (4), the molar ratio of epoxy groups in the epoxy vegetable oil to the propylene oxide is 1:(10-14), preferably 1:(10-11), most preferably 1:11; the reaction temperature of the fourth microchannel reactor is 80-150° C., preferably 110-130° C., most preferably 130° C.; the reaction residence time is 5-15 min, preferably 10-12 min, most preferably 12 min; the volume of the fourth microchannel reactor is 8-192 ml, most preferably 48 ml; and the flow rate of the solution E pumped into the microchannel reaction device is 0.8-6.4 ml/min, most preferably 2 ml/min.

In step (4), a discharge of the fourth microchannel reactor is subjected to pickling neutralization, liquid separation and rotary evaporation to obtain the polyols for preparing flexible polyurethane foam.

The acid is any one or more of hydrochloric acid, sulfuric acid and phosphoric acid, preferably hydrochloric acid, and the mass percentage concentration of the hydrochloric acid is 5%.

The microchannel reaction device comprises a first micromixer, a first microchannel reactor, a second micromixer, a second microchannel reactor, a third micromixer, a third microchannel reactor, a fourth micromixer and a fourth microchannel reactor connected sequentially through pipes. A reaction material is fed into the micromixer and subsequent equipment through a precise low-pulse pump.

The first micromixer, the second micromixer, the third micromixer and the fourth micromixer are each independently a Y-type mixer, a T-type mixer or a slit plate mixer LH25.

The first microchannel reactor, the second microchannel reactor, the third microchannel reactor and the fourth microchannel reactor are each independently a polytetrafluoroethylene coil having an inner diameter of 0.5-2 mm, preferably a polytetrafluoroethylene coil having an inner diameter of 1.0 mm.

A polyols for preparing flexible polyurethane foam prepared by the method.

Application of the polyols for preparing flexible polyurethane foam in the preparation of flexible polyurethane foam.

A preparation method of the flexible polyurethane foam comprises:

(1) uniformly mixing all substances in the Component A in the table 2 according to a weight ratio, maintaining a temperature at 25° C., and stirring the mixture with a high-speed disperser at a rotating speed of 1000 r/min for 10 minutes;

(2) maintaining a temperature of the Component B at 25° C.; and (3) mixing and pumping the materials obtained in the step (1) and the step (2) into a mixing head of a horizontal foaming machine according to a mass ratio of 1:1.05, mixing and stirring the mixture for 5 seconds at a stirring speed controlled to be 5000 r/min, continuously spraying the mixture into a mold for foaming for 120 seconds so as to be molded, and curing for 8 hours at a room temperature to obtain flexible polyurethane foam plastic.

As a new synthesis technology, microchannel reaction has certain applications in the fields of chemical engineering, synthesis, chemistry, pharmaceutical industry, analysis and biochemical processes, and is also an international research hotspot in the technical field of fine chemical industry. Compared with the conventional reaction system, the microchannel reaction has the advantages of high reaction selectivity, high mass transfer and heat transfer efficiency, high reaction activity, short reaction time, high conversion rate, good safety, easy control and the like. The application of the microchannel reaction technology in polyhydroxy compound ring-opening epoxy vegetable oil can improve the reaction efficiency, control the occurrence of side reactions and lower the energy consumption.

The present invention has the following beneficial effects: the preparation method has the advantages of continuous operation, simple and controllable preparation process, short reaction time, low energy consumption, low cost, short reaction time and fewer side reactions; the raw materials are green and environmentally friendly and have abundant sources; and the prepared polyols for preparing flexible polyurethane foam has the advantages of light color, low viscosity and good fluidity, and has a flame-retardant effect due to the phosphorus or chlorine element contained therein. The flame-retardant flexible polyurethane foam material prepared by using the polyols for preparing flexible polyurethane foam of the present invention has the characteristics of good flame-retardant effect, high oxygen index, low smoke density, good dimensional stability and high mechanical strength.

DETAILED DESCRIPTION OF THE INVENTION

The related determination methods of the prepared polyols for preparing flexible polyurethane foam and polyurethane foam of the present invention are as follows:

The hydroxyl value of the polyols for preparing flexible polyurethane foam is determined according to the GB/T 12008.3-1989 method; the viscosity of the polyols for preparing flexible polyurethane foam is determined according to the GB/T 12008.8-1992 method; the density of the polyurethane foam is determined according to the GB 6343-86; the tensile strength is determined according to the GB/T 1040-92 method; the rebound rate is determined according to the GB 6670-1997 method; the oxygen index is determined according to the GB/T 2406-1993 method; and the smoke density is determined according to the GB 8323-1987 method.

Figure 1:
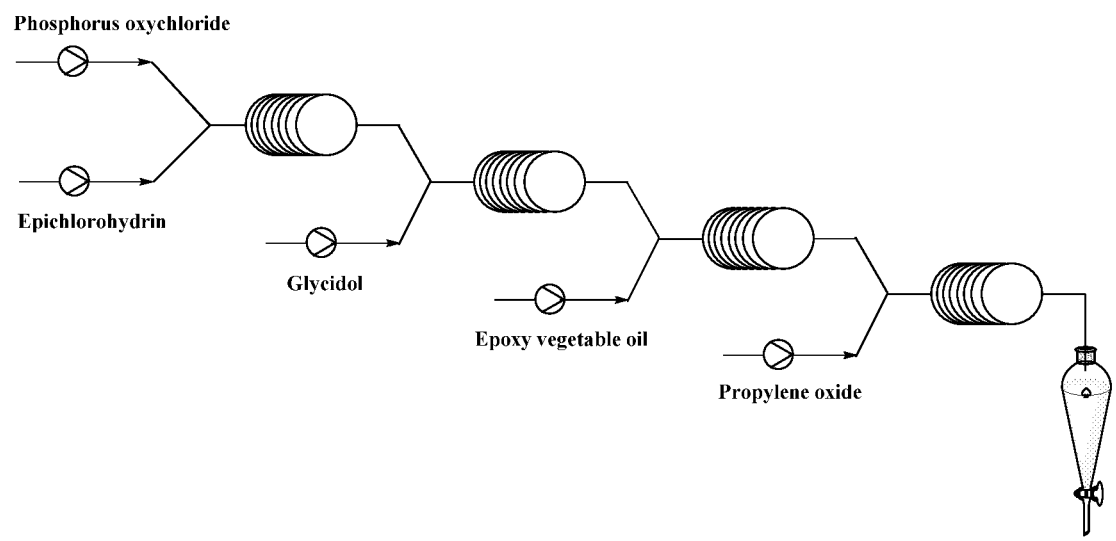
FIG. 1 is a schematic view of a microchannel reaction device.
Figure 2:
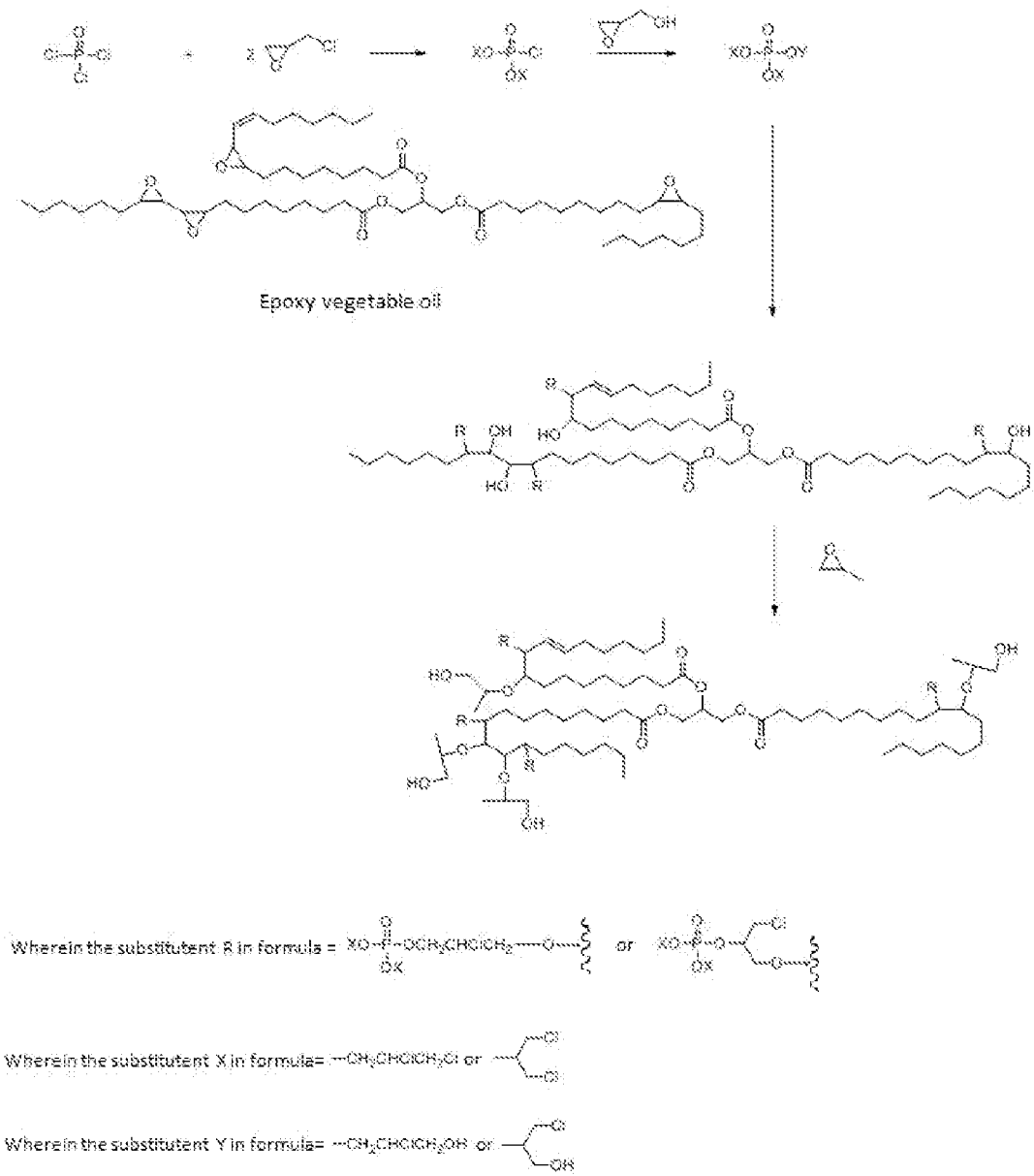
FIG. 2 is a schematic diagram of synthesis of a polyols for preparing flexible polyurethane foam.

The microchannel reaction device described in the following examples, as shown in FIG. 1, comprises a first micromixer, a first microchannel reactor, a second micromixer, a second microchannel reactor, a third micromixer, a third microchannel reactor, a fourth micromixer and a fourth microchannel reactor connected sequentially through pipes. A reaction material is fed into the micromixer and subsequent equipment through a precise low-pulse pump.

The first micromixer, the second micromixer, the third micromixer and the fourth micromixer are each independently a Y-type mixer, a T-type mixer or a slit plate mixer LH25. The first microchannel reactor, the second microchannel reactor, the third microchannel reactor and the fourth microchannel reactor are each independently a polytetrafluoroethylene coil having an inner diameter of 1.0 mm.

Example 1

153 g of phosphorus oxychloride was dissolved in 400 ml of carbon tetrachloride to obtain a solution A, 195 g of epichlorohydrin and 6.6 g of aluminum chloride were dissolved in 400 ml of carbon tetrachloride to obtain a mixed solution B, 74.08 g of glycidol and 4 g of aluminum chloride were dissolved in 800 ml of carbon tetrachloride to obtain a mixed solution C, 216 g of epoxy soybean oil and 0.06 g of cesium carbonate were dissolved in 1600 ml of carbon tetrachloride to obtain a mixed solution D, and 175 g of propylene oxide was dissolved in 3200 ml of carbon tetrachloride to obtain a solution E, wherein the molar ratio of the phosphorus oxychloride to the epichlorohydrin to the glycidol was 1:2.1:1, the molar ratio of epoxy groups in the epoxy vegetable oil to the hydroxy compound was 1:1.1, and the molar ratio of epoxy groups in the epoxy soybean oil to the propylene oxide was 1:11; the solution A and the solution B were simultaneously pumped into a first micromixer respectively, thoroughly mixed, and introduced into a first microchannel reactor to react, thereby obtaining reaction effluent; the reaction effluent and the solution C were simultaneously pumped into a second micromixer respectively, thoroughly mixed, introduced into a second microchannel reactor to react, thereby obtaining reaction effluent containing a hydroxy compound; the reaction effluent containing a hydroxy compound and the solution D were simultaneously pumped into a third micromixer respectively, thoroughly mixed, and introduced into a third microchannel reactor to be subjected to a ring-opening reaction, thereby obtaining reaction effluent containing a vegetable oil polyol; the reaction effluent and the solution E were simultaneously pumped into a fourth micromixer respectively, thoroughly mixed, and introduced into a fourth microchannel reactor to carry out an addition polymerization reaction, wherein the flow rates of the solutions A, B, C, D and E were respectively 0.25 ml/min, 0.25 ml/min, 0.5 ml/min, 1 ml/min and 2 ml/min; the first microchannel reactor of the microchannel reaction device had a volume of 3.5 ml, a reaction temperature of 80° C., and a reaction time of 7 min; the second microchannel reactor had a volume of 8 ml, a reaction temperature of 85° C., and a reaction time of 8 min; the third microchannel reactor had a volume of 20 ml, a reaction temperature of 120° C., and a reaction time of 10 min; and the fourth microchannel reactor had a volume of 48 ml, a reaction temperature of 130° C., and a reaction time of 12 min. The product after the completion of the reaction was introduced into a separator and allowed to stand for stratification, the lower aqueous solution was removed, the upper organic phase was neutralized with 5 wt % hydrochloric acid and washed to a pH value of 6.5-7.5, liquid separation was carried out, and the organic phase was subjected to rotary evaporation and drying to obtain the polyols for preparing flexible polyurethane foam.

Example 2

153 g of phosphorus oxychloride was dissolved in 400 ml of carbon tetrachloride to obtain a solution A, 203.5 g of epichlorohydrin and 6.6 g of aluminum chloride were dissolved in 400 ml of carbon tetrachloride to obtain a mixed solution B, 96 g of glycidol and 4 g of aluminum chloride were dissolved in 800 ml of carbon tetrachloride to obtain a mixed solution C, 308 g of epoxy soybean oil and 0.09 g of cesium carbonate were dissolved in 1600 ml of carbon tetrachloride to obtain a mixed solution D, and 145 g of propylene oxide was dissolved in 3200 ml of carbon tetrachloride to obtain a solution E, wherein the molar ratio of the phosphorus oxychloride to the epichlorohydrin to the glycidol was 1:2.2:1.3, the molar ratio of epoxy groups in the epoxy vegetable oil to the hydroxy compound was 1:1.3, and the molar ratio of epoxy groups in the epoxy soybean oil to the propylene oxide was 1:10; the volumes of the four series connected microchannel reactors of the microchannel reaction device, the flow rates of the solutions A, B, C, D and E, and the times and temperatures of the microchannel reactions were the same as those in example 1. The product after the completion of the reaction was introduced into a separator and allowed to stand for stratification, the lower aqueous solution was removed, the upper organic phase was neutralized with 5 wt % hydrochloric acid and washed to a pH value of 6.5-7.5, liquid separation was carried out, and the organic phase was subjected to rotary evaporation and drying to obtain the polyols for preparing flexible polyurethane foam.

Example 3

Different from example 1, the reaction temperatures of the four microchannel reactors were respectively 80° C., 90° C., 110° C. and 115° C.

Example 4

Different from example 1, the flow rates of the solutions A, B, C, D and E were respectively 0.35 ml/min, 0.35 ml/min, 0.7 ml/min, 1.4 ml/min and 2.8 ml/min; the first microchannel reactor had a volume of 3.5 ml and a reaction time of 5 min; the second microchannel reactor had a volume of 7 ml and a reaction time of 5 min; the third microchannel reactor had a volume of 33.6 ml and a reaction time of 12 min; and the fourth microchannel reactor had a volume of 56 ml and a reaction time of 10 min.

Example 5

Different from example 1, the epoxy vegetable oil was epoxy rapeseed oil, that is, 250 g of epoxy rapeseed oil and 0.075 g of cesium carbonate were dissolved in 1600 ml of carbon tetrachloride to obtain a solution D, and 145 g of propylene oxide was dissolved in 3200 ml of carbon tetrachloride to obtain a solution E, wherein the molar ratio of the phosphorus oxychloride to the epichlorohydrin to the glycidol was 1:2.1:1, the molar ratio of epoxy groups in the epoxy vegetable oil to the hydroxy compound was 1:1.1, and the molar ratio of epoxy groups in the epoxy rapeseed oil to the propylene oxide was 1:10.

Example 6

Different from example 1, the epoxy vegetable oil was epoxy palm oil, that is, 533 g of epoxy palm oil and 0.26 g of cesium carbonate were dissolved in 1600 ml of carbon tetrachloride to obtain a solution D, and 570 g of propylene oxide was dissolved in 3200 ml of carbon tetrachloride to obtain a solution E, wherein the molar ratio of the phosphorus oxychloride to the epichlorohydrin to the glycidol was 1:2.1:1, the molar ratio of epoxy groups in the epoxy vegetable oil to the hydroxy compound was 1:1.1, and the molar ratio of epoxy groups in the epoxy palm oil to the propylene oxide was 1:12.

Example 7

Different from example 1, the epoxy vegetable oil was epoxy corn oil, that is, 250 g of epoxy corn oil and 0.075 g of cesium carbonate were dissolved in 1600 ml of carbon tetrachloride to obtain a solution D, and 145 g of propylene oxide was dissolved in 3200 ml of carbon tetrachloride to obtain a solution E, wherein the molar ratio of the phosphorus oxychloride to the epichlorohydrin to the glycidol was 1:2.1:1, the molar ratio of epoxy groups in the epoxy vegetable oil to the hydroxy compound was 1:1.1, and the molar ratio of epoxy groups in the epoxy corn oil to the propylene oxide was 1:10.

Table 1 shows performance indexes of the polyols for preparing flexible polyurethane foams prepared in examples 1-7 and performance indexes of the product obtained in the prior art (example 6 in Patent CN101054436A). The polyols for preparing flexible polyurethane foam obtained in examples 1-7 was used to prepare polyurethane foam according to the formula described in Table 2 without adding other flame retardants, and the performance indexes of the obtained products are shown in Table 3.

TABLE 1

Performance index of polyols for preparing flexible polyurethane foam

| Performance Index | Example 1 | Example 2 | Example 3 | Example 4 | Example 5 | Example 6 | Example 7 | Existing Product |
|---|---|---|---|---|---|---|---|---|
| Hydroxyl Value mgKOH/g | 42 | 31 | 30 | 33 | 40 | 30 | 32 | 32.5 |
| Viscosity mPas/25° C. | 600 | 710 | 800 | 760 | 640 | 920 | 700 | 950 |

It can be seen from Table 1 that the polyols for preparing flexible polyurethane foam obtained by the method of the present invention has low viscosity, good fluidity and good stability.

TABLE 2

Foaming formula of polyurethane foam

| Component A | Parts by Mass (Basic Formula) | Parts by Mass (Foaming Formula) |
|---|---|---|
| Ordinary 330N Polyether | 40-60 | 50 |
| Polyols (prepared by the method of the present invention) | 60-40 | 50 |
| Silicone Oil L-580 | 0.6-1.5 | 1.0 |
| Water | 3-5 | 3.3 |
| Crosslinker L | 1-2 | 1.0 |
| Cell Opener | 0.5-2 | 1.0 |
| Triethanolamine | 0.5-1.5 | 0.7 |
| Component B | | |
| TDI | 40-60 | 60 |
| MDI | 20-40 | 40 |
| Index | 1.05 | 1.05 |

Note:
Material temperature 25° C.
Cell Opener: cyclopentane;
TDI: toluene diisocyanate;
MDI: methylenediphenyl diisocyanate; a meaning of Index is a mass ratio of the Component A to the Component B;
Basic Formula is a reasonable parameter range of a mass ratio of raw materials used in polyurethane foaming; and
Foaming Formula is a mass ratio of raw materials used in the embodiment.

TABLE 3

Performance index of flame-retardant polyurethane foam

| Performance Index | Embodiment 1 | Embodiment 2 | Embodiment 3 | Embodiment 4 | Embodiment 5 | Embodiment 6 | Embodiment 7 | Existing Product |
|---|---|---|---|---|---|---|---|---|
| Oxygen Index/OI | 33 | 32 | 36 | 30 | 31 | 29 | 32 | 28.5 |
| Rebound Rate/% | 62 | 61 | 62 | 64 | 61 | 58 | 63 | 60 |
| Tensile Strength/KPa | 129 | 127 | 130 | 126 | 127 | 120 | 131 | 125 |
| Smoke Density/% | 32 | 34 | 33 | 39 | 38 | 40 | 37 | 57 |

It can be seen from Table 3 that under the condition of not using other liquid and solid flame retardants, the flame-retardant polyurethane foam product prepared by foaming the flexible foam flame-retardant polyols for preparing flexible polyurethane foam obtained by the method provided by the present invention has a high oxygen index, a good flame-retardant effect, high heat resistance, good dimensional stability and high strength, and can replace the existing product.

Example 8

This example is the same as example 1, except that:
The first and second acidic catalysts were sulfuric acid, the inert solvent was dichloroethylene, the epoxy vegetable oil was epoxy olive oil, the basic catalyst was sodium carbonate, the molar ratio of the phosphorus oxychloride to the epichlorohydrin to the first acidic catalyst was 1:1.9:0.02, the molar ratio of the phosphorus oxychloride to the second acidic catalyst was 1:0.02, and the molar ratio of epoxy groups in the epoxy vegetable oil to the hydroxy compound was 1:1; and the mass percentage of the basic catalyst to the epoxy vegetable oil was 0.02%, and the molar ratio of epoxy groups in the epoxy vegetable oil to the propylene oxide was 1:10. After test, the obtained polyols for preparing flexible polyurethane foam was found to have similar performance to the polyols for preparing flexible polyurethane foam obtained in example 1.

Example 9

This example is the same as example 1, except that:
The first and second acidic catalysts were hydrochloric acid, the inert solvent was dichloroethane, the epoxy vegetable oil was epoxy peanut oil, the basic catalyst was potassium hydroxide, the molar ratio of the phosphorus oxychloride to the epichlorohydrin to the first acidic catalyst was 1:2.3:0.08, the molar ratio of the phosphorus oxychloride to the second acidic catalyst was 1:0.05, and the molar ratio of epoxy groups in the epoxy vegetable oil to the hydroxy compound was 1:2; and the mass percentage of the basic catalyst to the epoxy vegetable oil was 0.1%, and the molar ratio of epoxy groups in the epoxy vegetable oil to the propylene oxide was 1:14. After test, the obtained polyols for preparing flexible polyurethane foam was found to have similar performance to the polyols for preparing flexible polyurethane foam obtained in example 1.

Example 10

This example is the same as example 1, except that:
The first and second acidic catalysts were fluoroboric acid, the inert solvent was chloroform, the epoxy vegetable oil was epoxy rapeseed oil, and the basic catalyst was triethylamine. The reaction temperature of the first microchannel reactor was 70° C., the reaction residence time was 10 min, and the volume of the first microchannel reactor was 2 ml; the reaction temperature of the second microchannel reactor was 70° C., the reaction residence time was 10 min, and the volume of the second microchannel reactor was 2 ml; the reaction temperature of the third microchannel reactor was 90° C.; the reaction residence time was 15 min, and the volume of the third microchannel reactor was 4 ml; the reaction temperature of the fourth microchannel reactor was 80° C.; and the reaction residence time was 15 min, and the volume of the fourth microchannel reactor was 8 ml. After test, the obtained polyols for preparing flexible polyurethane foam was found to have similar performance to the polyols for preparing flexible polyurethane foam obtained in example 1.

Example 11

This example is the same as example 1, except that:
The first and second acidic catalysts were ferric chloride, the inert solvent was n-hexane, the epoxy vegetable oil was epoxy corn oil, and the basic catalyst was sodium methoxide. The reaction temperature of the first microchannel reactor was 100° C., the reaction residence time was 5 min, and the volume of the first microchannel reactor was 8 ml; the reaction temperature of the second microchannel reactor was 100° C., the reaction residence time was 5 min, and the volume of the second microchannel reactor was 32 ml; the reaction temperature of the third microchannel reactor was 140° C.; the reaction residence time was 5 min, and the volume of the third microchannel reactor was 96 ml; the reaction temperature of the fourth microchannel reactor was 150° C.; and the reaction residence time was 5 min, and the volume of the fourth microchannel reactor was 192 ml. After test, the obtained polyols for preparing flexible polyurethane foam was found to have similar performance to the polyols for preparing flexible polyurethane foam obtained in example 1.

Example 12

This supplementary experiment is the same as example 1, except that: a ring-opening reagent 1,2,5,6-tetrabromo-3,4-dihydroxyhexane in Reference U.S. Pat. No. 3,779,953 was used as a ring-opening reagent of the present invention.

525 g of 1,2,5,6-tetrabromo-3,4-dihydroxyhexane was dissolved in 1600 ml of carbon tetrachloride to obtain a solution A, 216 g of epoxy soybean oil and 0.06 g of cesium carbonate were dissolved in 1600 ml of carbon tetrachloride to obtain a mixed solution B, and 175 g of propylene oxide was dissolved in 3200 ml of carbon tetrachloride to obtain a solution E. A molar ratio of epoxy groups in epoxy vegetable oil to a hydroxy compound was 1:1.1, and a molar ratio of epoxy groups in the epoxy soybean oil to a propylene oxide was 1:11; the solution A and the solution B were simultaneously pumped into a first micromixer respectively, thoroughly mixed, and introduced into a first microchannel reactor to be subjected to a ring-opening reaction, thereby obtaining reaction effluent containing a vegetable oil polyol; the reaction effluent and a solution C were simultaneously pumped into a second micromixer respectively, thoroughly mixed, and introduced into a second microchannel reactor to be subjected to an addition polymerization reaction, wherein the flow rates of the solutions A, B and C were respectively 1 ml/min, 1 ml/min and 2 ml/min; a first microchannel reactor of a microchannel reaction device had a volume of 20 ml, a reaction temperature of 120° C., and a reaction time of 10 min; and a second microchannel reactor had a volume of 48 ml, a reaction temperature of 130° C., and a reaction time of 12 min. The product after the completion of the reaction was introduced into a separator and allowed to stand for stratification, a lower aqueous solution was removed, an upper organic phase was neutralized with 5 wt % hydrochloric acid and washed to a pH value of 6.5-7.5, liquid separation was carried out, and an organic phase was subjected to rotary evaporation and drying to obtain a polyurethane polyol, a hydroxyl value of the polyurethane polyol was 83 mg KOH/g, and a viscosity was 1780 mPa·s. The obtained polyurethane polyol was prepared into polyurethane foam according to the formula described in Table 2, an oxygen index of the obtained product was 25 OI, a rebound rate was 52%, a tensile strength was 154 KPa, and a smoke density was 48%.

Example 13

In this supplementary experiment, α-hydroxyalkyl phosphate was prepared according to the method in Example 1 of Reference U.S. Pat. No. 3,332,893. 1265 g (9.2 mol) of PC13 was put into a 3 L flask, and 496 g (8.0 mol) of ethylene glycol was slowly dropped into the flask, a reaction temperature in a system was kept at 15-20° C. for 1.1 hours. After the completion of the dropping, the temperature was raised to 25° C., then the system was evacuated to the reaction temperature of 37-38° C., and the reaction was refluxed for 0.5 hour. After the completion of the refluxing, the reaction temperature was cooled to 24-30° C., 176 g (4 mol) of ethylene oxide was dropped under protection of nitrogen, the reaction temperature was raised to 28-35° C. within 0.1 hour, the mixture was stirred for 0.25 hour, and then added with 264 g (6.0 mol) of acetaldehyde, the temperature was raised to 70° C. within 0.7 hour simultaneously, and then the temperature was reduced to 54° C. within 0.5 hour. A mixed solution containing 57.6 g of water and 132 g of acetaldehyde was added into the flask, the reaction temperature was kept at 53-57° C., the mixture was stirred for 0.5 hour, and after the completion of the reaction, the α-hydroxyalkyl phosphate was obtained. The obtained α-hydroxyalkyl phosphate was prepared into polyurethane foam according to the formula described in Table 2, an oxygen index of the obtained product was 21 OI, a rebound rate was 43%, a tensile strength was 187 KPa, and a smoke density was 51%.

Example 14

In this supplementary experiment, flexible polyurethane foam was prepared according to the method in Example 4 of Reference U.S. Pat. No. 9,035,105. 762 g of castor oil and 0.12 g of DMC catalyst were added into a kettle reactor, and stirred, and a reaction temperature was 130° C. 25.2 g of ethylene oxide and 5.2 g of propylene oxide were added into the reactor to activate the catalyst, and catalytic time was 30 min. After the catalyst was activated, 526.8 g of ethylene oxide and 2625.8 g of propylene oxide were introduced, and flow rates of the ethylene oxide and the propylene oxide were 3.32 g/min and 15.8 g/min respectively. After reacting for 35 min, 55 g of glycerol was introduced, a flow rate of the glycerol was 0.44 g/min, and reaction time was 3 hours. After the completion of the reaction, a reaction solution was cooled for 30 min to obtain a polyurethane polyol. The obtained polyurethane polyol was foamed and prepared into flexible polyurethane foam according to the formula described in Table 1 of Reference U.S. Pat. No. 9,035,105, an oxygen index of the obtained product was 23 OI, a rebound rate was 41%, a tensile strength was 193 KPa, and a smoke density was 54%.

Example 15

In this supplementary experiment, a polyurethane polyol was prepared according to Route 3 in Example 4 of Reference U.S. Ser. No. 10/246,547, and polyurethane foam was prepared by using the formula in Example 13. 40.0 g of palm oil, 4.32 g of pentaerythritol and 0.02 g of lead oxide were added into a 500 mL reaction bottle, and condensed and refluxed for 2 hours under protection of nitrogen, and a reaction temperature was 200° C. After the completion of the reaction, a reaction solution was cooled and added with 40 mL of n-hexane, glycerol and precipitates were removed, and an organic phase was rotationally evaporated to obtain a polyols.

The obtained polyols was foamed and prepared into polyurethane foam according to the formula described in Example 13 of Reference U.S. Ser. No. 10/246,547. 10 g of palm oil polyol, 6.85 g of diethylene glycol, 0.27 g of surfactant, 0.19 g of DBTL and 2.69 g of water were mixed, reacted at 70° C. under a normal pressure, and stirred at 800 rpm for 3 hours, then 13.2 g of TDI was added, reacted at 50° C. under a normal pressure, and stirred at 800 rpm for 2 hours. An oxygen index of the obtained product was 16 OI, a rebound rate was 27%, a tensile strength was 295 KPa, and a smoke density was 62%.

Example 16

In this supplementary experiment, rigid polyurethane foam was prepared according to the method in Example 1 of Reference U.S. Pat. No. 3,660,502. 50.9 g of glycerol, 241.7 g of chloral and 85.1 g of ethylene oxide were added into a 1 L reaction bottle, and stirred and reacted at 90-100° C. for 5 hours under a normal pressure to obtain a polyols. The obtained polyols was foamed and prepared into the rigid polyurethane foam according to the formula in Example 1 of Reference U.S. Pat. No. 3,660,502. An oxygen index of the obtained product was 24 OI, a rebound rate was 23%, a tensile strength was 331 KPa, and a smoke density was 47%.

Example 17

In this supplementary experiment, a polyols was prepared according to the method in Example 4 of Specific Batch Examples of Reference U.S. Pat. No. 8,507,701. 100 g of soybean oil, 17 mL of glacial acetic acid and 35% hydrogen peroxide were added into a 1 L round-bottom flask, then added with 11.1 mL of formic acid, stirred and reacted at 50° C. under a normal pressure until a temperature was raised to 105° C., and reacted for 3 hours. After the completion of the reaction, water and acid were removed by post-treatment to obtain a polyols. The obtained polyols was foamed and prepared into polyurethane foam according to the formula in Example 1 of Polyurethane Product Example of Reference U.S. Pat. No. 8,507,701. An oxygen index of the obtained product was 23 OI, a rebound rate was 49%, a tensile strength was 176 KPa, and a smoke density was 45%.

What is claimed is:

1. A method for preparing polyols for making flexible polyurethane foam, characterized by comprising the following steps:
   (1) simultaneously pumping a solution A obtained by dissolving phosphorus oxychloride in an inert solvent and a solution B obtained by dissolving epichlorohydrin and a first acidic catalyst in an inert solvent into a first microchannel reactor of a microchannel reaction device to carry out a reaction, thereby obtaining a chloroalkoxy phosphorus compound;
   (2) simultaneously pumping a solution C obtained by dissolving glycidol and a second acidic catalyst in an inert solvent and the chloroalkoxy phosphorus compound obtained in step (1) into a second microchannel reactor of the microchannel reaction device to carry out a reaction, thereby obtaining a reaction solution containing a hydroxy compound;
   (3) simultaneously pumping a solution D obtained by dissolving epoxy vegetable oil and a basic catalyst in an inert solvent and the hydroxy compound obtained in step (2) into a third microchannel reactor of the microchannel reaction device to carry out a ring-opening reaction, thereby obtaining a vegetable oil polyol; and
   (4) simultaneously pumping a solution E obtained by dissolving propylene oxide in an inert solvent and the vegetable oil polyol obtained in step (3) into a fourth microchannel reactor of the microchannel reaction device to carry out an addition polymerization reaction, thereby obtaining the polyols for preparing flexible polyurethane foam.

2. The method according to claim 1, characterized in that in step (1), the molar ratio of the phosphorus oxychloride to the epichlorohydrin to the first acidic catalyst is 1:(1.9-2.3):(0.02-0.08); the reaction temperature of the first microchannel reactor is 70-100° C.; the reaction residence time is 5-10 min; the volume of the first microchannel reactor is 2-8 ml; and the flow rate of the solution A pumped into the microchannel reaction device is 0.1-0.8 ml/min; and the flow rate of the solution B pumped into the microchannel reaction device is 0.1-0.8 ml/min.

3. The method according to claim 1, characterized in that the inert solvent is any one or more of benzene, dichloroethylene, dichloroethane, chloroform, pentane, n-hexane, carbon tetrachloride and xylene; and the first acidic catalyst in step (1) and the second acidic catalyst in step (2) are each independently any one or more of sulfuric acid, hydrochloric acid, phosphoric acid, fluoroboric acid, aluminum chloride and ferric chloride.

4. The method according to claim 1, characterized in that the molar ratio of the phosphorus oxychloride in step (1) to the glycidol in step (2) is 1:(1-1.3); the molar ratio of the phosphorus oxychloride to the second acidic catalyst is 1:(0.02-0.05); the reaction temperature of the second microchannel reactor is 70-100° C.; the reaction residence time is 5-10 min; the volume of the second microchannel reactor is 2-32 ml; and the flow rate of the solution C pumped into the microchannel reaction device is 0.2-1.6 ml/min.

5. The method according to claim 1, characterized in that in step (3), the epoxy vegetable oil is any one or more of epoxy olive oil, epoxy peanut oil, epoxy rapeseed oil, epoxy cotton seed oil, epoxy soybean oil, epoxy coconut oil, epoxy palm oil, epoxy sesame oil, epoxy corn oil or epoxy sunflower oil; the basic catalyst is any one or more of cesium carbonate, sodium carbonate, potassium carbonate, sodium hydroxide, potassium hydroxide, sodium bicarbonate, magnesium carbonate, triethylamine, pyridine or sodium methoxide; the molar ratio of epoxy groups in the epoxy vegetable oil to the hydroxy compound is 1:(1-2); and the mass percentage of the basic catalyst to the epoxy vegetable oil is 0.02-0.1%.

6. The method according to claim 1, characterized in that in step (3), the reaction temperature of the third microchannel reactor is 90-140° C.; the reaction residence time is 5-15 min; the volume of the third microchannel reactor is 4-96 ml; and the flow rate of the solution D pumped into the microchannel reaction device is 0.4-3.2 ml/min.

7. The method according to claim 1, characterized in that in step (4), the molar ratio of epoxy groups in the epoxy vegetable oil to the propylene oxide is 1:(10-14); the reaction temperature of the fourth microchannel reactor is 80-150° C.; the reaction residence time is 5-15 min; the volume of the fourth microchannel reactor is 8-192 ml; and the flow rate of the solution E pumped into the microchannel reaction device is 0.8-6.4 ml/min.

8. The method according to claim 1, characterized in that the microchannel reaction device comprises a first micromixer, a first microchannel reactor, a second micromixer, a second microchannel reactor, a third micromixer, a third microchannel reactor, a fourth micromixer and a fourth microchannel reactor connected sequentially through pipes.

* * * * *